United States Patent [19]

Lindberg

[11] Patent Number: 5,639,347

[45] Date of Patent: *Jun. 17, 1997

[54] METHOD OF CONTROLLING OF METALS IN A BLEACH PLANT, USING OXIDATION

[75] Inventor: Hans G. Lindberg, Glens Falls, N.Y.

[73] Assignee: Ahlstrom Machinery Inc., Glens Falls, N.Y.

[*] Notice: The term of this patent shall not extend beyond the expiration date of Pat. No. 5,401,362.

[21] Appl. No.: 113,645

[22] Filed: Aug. 31, 1993

Related U.S. Application Data

[63] Continuation-in-part of Ser. No. 35,478, Mar. 24, 1993, Pat. No. 5,401,362.

[51] Int. Cl.$^6$ .................. D21C 9/153; D21C 9/16; D21C 11/00

[52] U.S. Cl. .................. 162/29; 162/30.1; 162/37; 162/38; 162/65; 162/78; 210/712; 210/724; 210/722; 210/912; 210/919; 210/928

[58] Field of Search .................. 162/29, 30.1, 30.11, 162/63, 65, 37, 40, 78; 210/218, 225, 228, 928, 721, 722, 724, 912, 919, 712, 705

[56] References Cited

U.S. PATENT DOCUMENTS

| | | | |
|---|---|---|---|
| 4,196,043 | 4/1980 | Singh . | |
| 5,259,997 | 11/1993 | Kazuma | 261/119.1 |
| 5,338,460 | 8/1994 | Yen | 210/724 |
| 5,348,662 | 9/1994 | Yen et al. | 210/724 |
| 5,360,514 | 11/1994 | Henricson et al. | 162/31 |
| 5,509,999 | 4/1996 | Lindberg | 162/38 |

FOREIGN PATENT DOCUMENTS

| | | |
|---|---|---|
| 0151097 | 8/1985 | European Pat. Off. . |
| 0307295 | 3/1989 | European Pat. Off. . |
| 0564443 | 10/1993 | European Pat. Off. . |
| 9301161 | 10/1994 | Sweden . |
| WO93/23607 | 11/1993 | WIPO . |
| WO94/01615 | 1/1994 | WIPO . |
| WO94/12720 | 6/1994 | WIPO . |

OTHER PUBLICATIONS

Kvaerner Pulping, "Observation by Third Party Against European patent appln. No. 94910843.5 . . . ", Mar. 4, 1996.

Dean et al, "Removing heavy metals from waste water", Environmental Science & Technology, vol. 6, No. 6, Jun., 1972, pp. 518–522.

Patterson et al, "Carbonate precipitation for heavy metals pollutants", Journal WPCF, Dec. 1977, pp. 2397–2410.

*Primary Examiner*—Steven Alvo
*Attorney, Agent, or Firm*—Nixon & Vanderhye P.C.

[57] ABSTRACT

A method and apparatus facilitate removal of metals from acidic liquids containing dissolved metals (such as pulp mill bleach plant washer filtrate) by oxidizing the liquid with ozone, hydrogen peroxide, oxygen, and/or air to increase the valence of the metals (like Mn and Fe) so that they become easier to precipitate. Oxidation may be practiced using any suitable reactor, such as a gas-contact reactor, or a plunger type reactor where the oxidizing agent is primarily gaseous, or a static mixer or stirred tank where the oxidizing agent is primarily liquid. After oxidation the pH of the liquid is adjusted (e.g. to over 6, preferably about 8–11) to precipitate the metals. The precipitated metals are then removed by filtration, sedimentation or flotation, and the metals-depleted liquid used elsewhere in the pulp mill.

19 Claims, 2 Drawing Sheets

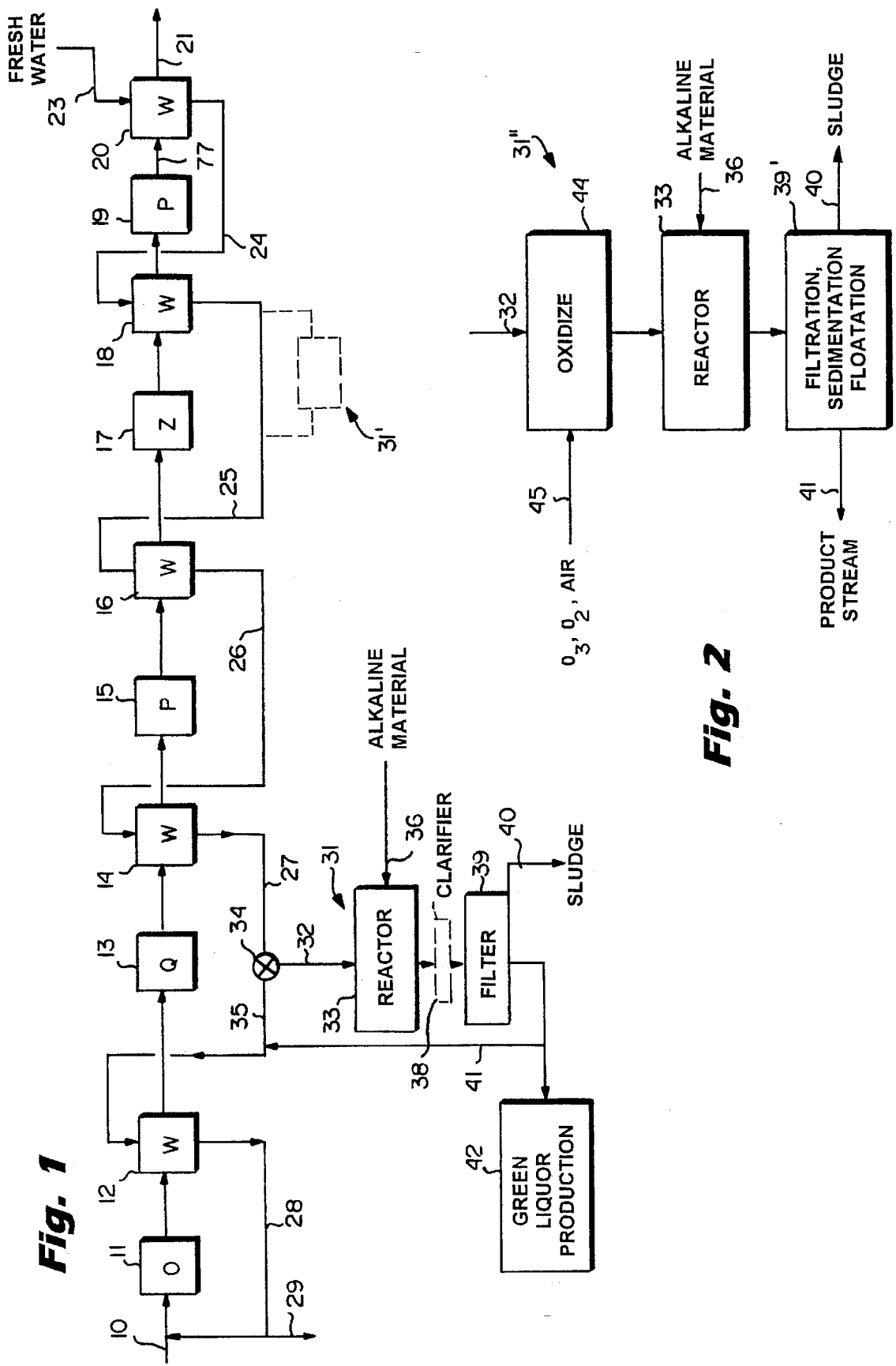

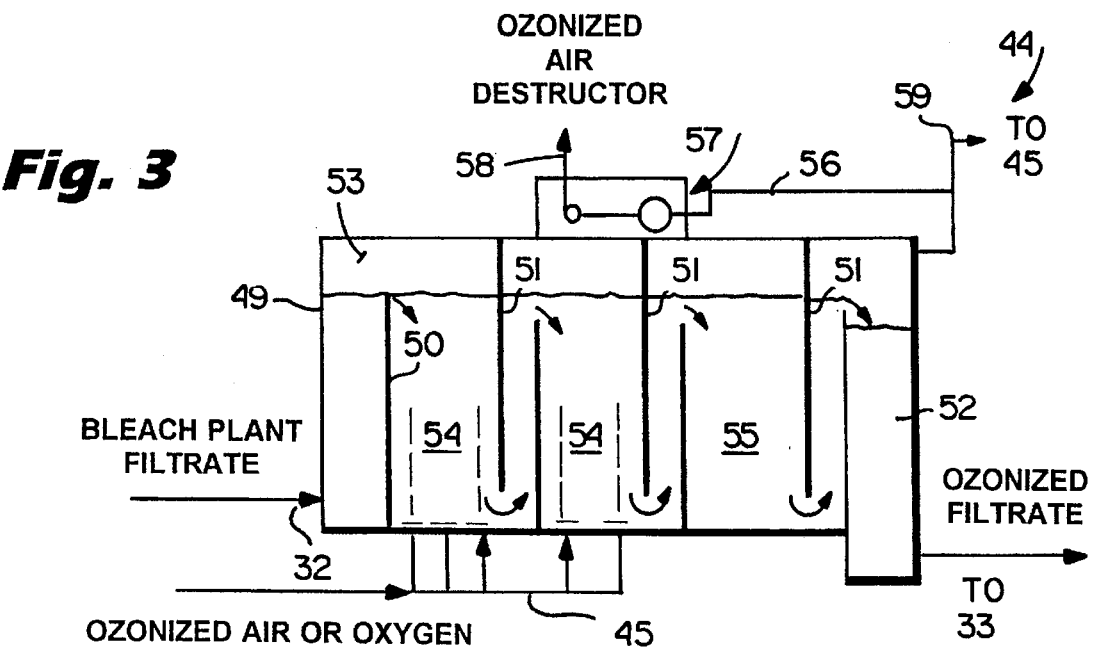
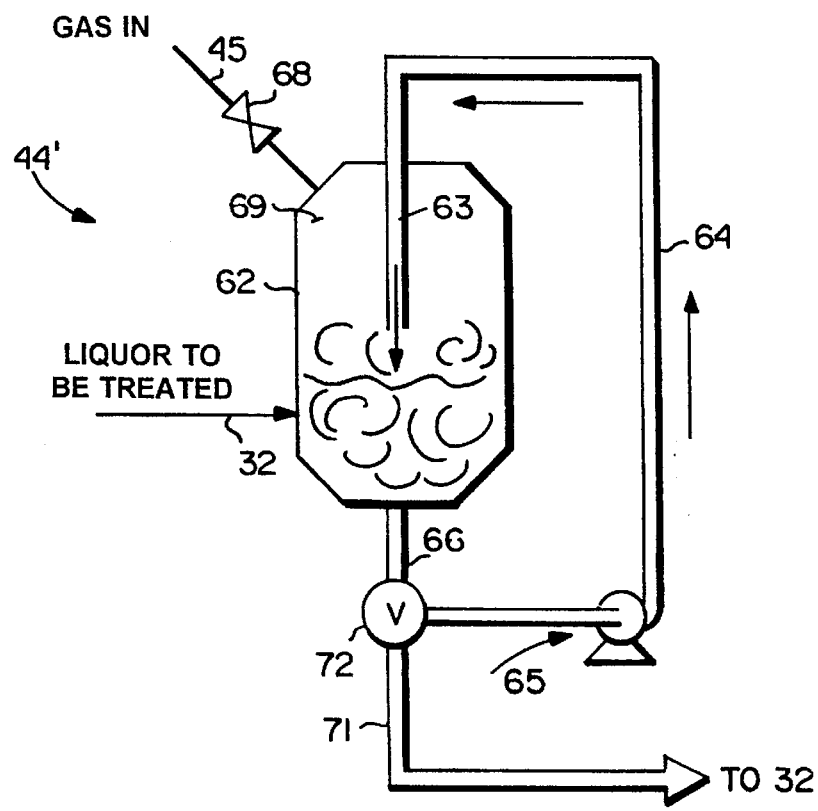

METHOD OF CONTROLLING OF METALS IN A BLEACH PLANT, USING OXIDATION

CROSS-REFERENCE TO RELATED APPLICATION

This application is a continuation-in-part of application Ser. No. 08/035,478 filed Mar. 24, 1993, now U.S. Pat. No. 5,401,362.

BACKGROUND AND SUMMARY OF THE INVENTION

The parent application shows a method and apparatus for minimizing adverse environmental impact of the production of kraft pulp, or the like, by bleaching the pulp without chlorine or chlorine-containing liquids, and removing metals (such as Mn, Fe and Cu) to prevent buildup of those metals to a level adversely affecting the bleaching reactions. Basically, according to the parent application an acidic liquid stream, such as washer filtrate following a bleach plant acidic stage, is treated with alkaline material and carbonate in a reactor so that the pH is raised to a point where much of the dissolved metal in the filtrate precipitates out, and the precipitated metals are removed by optional clarification and/or filtration. The carbonate controls the calcium level of the filtrate.

According to the present invention, a method and apparatus are provided which improve upon the parent application at least for situations where the bleaching stage just prior to the filtrate wash is not an ozone stage, by oxidizing the filtrate (or other acidic liquid containing dissolved metals) to increase the valence of the metals like Mn and Fe so that they become easier to precipitate or flocculate. That is, by oxidizing a liquid stream according to the invention, the metals precipitate at lower pH's, and the species formed have lower solubility at a given pH than the species predominant in the unoxidized filtrate, making metals removal easier and/or more complete.

According to one aspect of the present invention, a method of removing metals from liquid streams in a cellulose pulp mill is provided, the method comprising the steps of substantially continuously: (a) treating digested pulp in an acidic or neutral stage to dissolve metals; (b) washing or thickening the pulp after step (a) to produce filtrate containing dissolved metals; (c) oxidizing the filtrate to increase the valence of the dissolved metals so that they become easier to precipitate or flocculate; (d) adjusting the pH of the filtrate so that it is at least 6, to cause dissolved metals to precipitate as solids in the pH adjusted filtrate; (e) removing the precipitated solids from the filtrate; and (f) using the reduced metal content filtrate elsewhere in the pulp mill.

Step (e) is typically practiced by filtration, flotation, or sedimentation. Step (c) is typically practiced by bringing a gas selected from the group consisting essentially of air, ozone, oxygen, and combinations thereof, into intimate contact with the filtrate, e.g. using any suitable reactor, such as a plunger type reactor, or a gas-contact reactor, or bringing hydrogen peroxide liquid into contact therewith. Where ozone is used, step (c) is typically practiced at a pH of 2 or more, where oxygen, air, or oxygen-enriched air are used, step (c) is typically practiced at a pH of 4 or more, and when peroxide is used the pH in step (c) is somewhere between. Typically, step (c) is also practiced to provide a filtrate carbonate content of at least about 0.01 mole/l., as by adding carbonate ion so that the filtrate has a carbonate level of approximately 0.05 mole/l.

According to another aspect of the present invention, a method of treating digested kraft pulp is provided, comprising the steps of: (a) oxygen delignifying the kraft pulp; (b) treating the oxygen delignified pulp in an acidic stage, with or without chelation; (c) washing or thickening the pulp after step (b) to produce a filtrate; (d) oxidizing the filtrate to increase the valence of dissolved metals in the filtrate so that the metals become easier to precipitate; (e) adjusting the pH of the filtrate after step (d) to precipitate metals out of the filtrate; and (f) removing the precipitated metals from the pH adjusted filtrate. Steps (d)–(f) may be practiced as described above with respect to the previous aspect of the invention.

According to another aspect of the invention, an apparatus is provided for oxidizing an acidic liquid containing dissolved metals, comprising: (a) means for bringing the acidic liquid into intimate contact with an oxidizing fluid in such a way so as to increase the valence of the metals in the liquid so that they become easier to precipitate, producing a product stream; (b) means for adjusting the pH of the product stream to precipitate metals from the liquid of the stream; and (c) means for removing the precipitated metals from the product stream. The means for removing precipitated metals preferably comprises filtration means, sedimentation means, or flotation means, and the means (a) may comprise any type of conventional reactor that gets intimate contact, such as a gas-contact reactor or a plunger type reactor.

It is the primary object of the present invention to provide for the effective removal of metals from an acidic liquid containing dissolved metals, such as filtrate from a wash or thickening stage following an acidic pulp bleach stage. This and other objects of the invention will become clear from an inspection of the detailed description of the invention, and from the appended claims.

BRIEF DESCRIPTION OF THE DRAWINGS

FIG. 1 is a schematic illustration of an exemplary bleaching sequence for kraft pulp utilizing metals removal according to the parent application;

FIG. 2 is a detailed schematic of part of the illustration of FIG. 1 schematically showing the oxidizing apparatus and method step according to the present invention;

FIG. 3 is a schematic side cross-sectional view of a gas-contact reactor that may be used to practice the oxidation step according to the invention; and FIG. 4 is a view like that of FIG. 3 for a plunger type reactor that may be used instead of the reactor of FIG. 3.

DETAILED DESCRIPTION OF THE DRAWINGS

In FIG. 1, digested pulp, e.g. from a continuous kraft digester, in line 10 is acted upon to effect delignification and bleaching thereof. This is accomplished by continuously removing metal ions (such as manganese, zinc, cobalt, iron, and copper) which consume bleaching chemicals (particularly ozone, peroxide, and oxygen) from an acidic effluent stream so as to minimize chemical consumption during bleaching. The metal-depleted alkaline effluent stream is then used as needed in the fiberline, including in the bleach stages.

In the embodiment illustrated in FIG. 1, the pulp in line 10 passes to oxygen reactor 11 where oxygen delignification takes place, and then the oxygen delignified pulp is subjected to a wash or thickening in washing or thickening stage 12, which produces a filtrate. After stage 12 it passes to a chelating stage 13, e.g. an EDTA stage, an acid only stage, a combination EDTA-acid stage, etc. In the chelating stage 13 the pulp is subjected to an acidic or neutral treatment, dissolving transition metals. After the stage 13 the pulp is washed or thickened as indicated at stage 14, and then passes to various bleaching stages. For the particular sequence illustrated in FIG. 1, there is a first peroxide stage 15, followed by a wash 16, then a first ozone stage 17, followed by a wash 18, and then a second peroxide stage 19 followed by a final wash 20, the digested, delignified, bleached, and washed pulp of desired brightness that is produced being discharged in line 21. A number of modifications may be made of the bleaching sequence according to the invention, for example a ZEZP sequence may be utilized (the E stage may be an $E_{op}$ stage), with or without a chelating stage before the first Z stage, or a wide variety of other bleaching sequences may be utilized including a TCF sequence, or a D sequence.

In the practice of the exemplary method schematically illustrated in FIG. 1, fresh wash water is added at 23, and then the wash water or filtrate from each subsequent stage is used as wash water in a previous stage. For example in the embodiment illustrated in the drawing wash water 24 from stage 20 is used in stage 18, wash water in line 25 from stage 18 is used in stage 16, and wash water in line 26 from stage 16 is used in stage 14, and wash water in line 27 from stage 14 is used i stage 12. Fresh water can be utilized with various other washing stages besides the stage 20, as necessary, and the filtrate lines from each of the washing stages need not pass back to exactly the preceding stage, but to an earlier preceding stage (e.g. from one alkaline stage to another). The filtrate from stage 12 may be recirculated in lien 28 to be added to the pulp, or may be otherwise treated as shown schematically by line 29.

An exemplary treatment sequence is shown schematically and generally by reference numeral 31 in FIG. 1. In FIG. 1, the sequence 31 is shown in association with the T stage 13, but it may be utilized in association with an (or more than one) acidic stage, such as shown at 31' in FIG. 1 (there associated with a Z stage).

The sequence 31 has as the input thereof filtrate from line 27, which passes in line 32 to a reactor 33. A valve 34 may be provided in the line 27 for diverting a substantial portion of the filtrate in line 27 to the line 32, while allowing other filtrate—e.g. in line 35—to pass directly to the stage 12 without treatment. Typically at least about half of the filtrate in line 27 is diverted by valve 34 to line 32, but anywhere from about 25–100% maybe diverted into lines 32.

In the reactor 33 alkaline material is added as indicated at 36 to adjust the pH of the filtrate so that it is greater than 9 (preferably greater than 10.5, and in a typical situation about 10–11), such a high pH causing the transition metals that were dissolved in stage 13, which have been washed out into filtrate from wash or thickening stage 14 into filtrate line 27, to precipitate out. The alkaline material added in line 36 maybe from a wide variety of alkali sources, such as a calcium source including lime (including reburned lime, slaked lime, $CaCO_2$, $Ca(OH)_2$, CaO, and the like), lime mud, lime milk, slaker grits, alkali bleach plant effluent (e.g. from a peroxide stage), clarified or unclarified green liquor, and/or clarified or unclarified white liquor. (The green and white liquors may be oxidized or unoxidized.)

It is desirable that at least some of the alkali material added in line 36 have a high enough concentration of carbonate ions so as to keep the calcium content to a minimum. Alkaline materials with carbonate ions include green and white liquor. The alkaline material may also be provided in the form of carbonate from carbon dioxide. The $CO_2$ may be obtained from any mill combustion process, e.g. the lime kiln, recovery boiler or hogged fuel boiler, or can be obtained from a commercial source (e.g. as a liquid). If in gaseous form, the $CO_2$ can be bubbled through the effluent, or can be scrubbed with effluent in a conventional scrubber (not shown) prior to reactor 33. Preferably during the practice of the sequence 31 a filtrate carbonate content of at least about 0.01 moles per liter, and preferably about 0.05 moles per liter, is provided, the amount of carbonate ion added to reactor 33 dependant upon the amount of carbonate ion already present in the filtrate in line 27.

It is preferred that the filtrate be maintained at a particular temperature for a particular period of time, at the desired alkaline pH conditions, in the reactor 33 in order to ensure sufficient precipitation of the manganese, iron, copper, zinc, cobalt, and like metal ions from the originally acidic filtrate. The temperature at which reaction takes place and the time of reaction are dependent upon the source of the acidic effluent. If the source is an ozone stage the effluent arrives at the reactor at about 30°–70° C. and requires about 40–60 minutes reaction time. If the source is a chelating stage, the effluent arrives at the reactor at about 70°–90° C. and requires about 5–30 minutes reaction time. If it is desired to speed up the reaction (reduce the time in reactor 33) the filtrate in line 32 may be heated above the temperatures indicated above (e.g. with steam in an indirect heater). Furthermore, precipitation is enhanced by maintaining a minimum concentration of suspended solids in the treatment reactor. The alkaline sources containing particulate mentioned above, e.g. lime mud, slaker grits, etc., can be added to maintain the concentration of suspended solids.

One of the functions of such a reactor 33 is to gently agitate the reaction mixture to maintain the level of suspended solids and enhance precipitation.

The type of reactor 33 may vary widely, but preferably is a slaker type reactor, or a liquid fluidized bed where the bed is made up of lime mud or grits, and the bed aids in precipitation.

After treatment in reactor 33, the solid phase (precipitate) of the metal ions must be removed as efficiently as possible. An optional clarifier 38 may be used before the filtrate with precipitated solids is fed to the filter device 39. The conventional clarifier 38 is necessary if the filter 39 is a polishing type filter. The clarifier 38 is not necessary, through it may be desirable, if the filter 39 is a precoat filter of drum, disc, or planar type. The filter 39 may be a conventional drum filter.

The sludge from filter 39 passes in line 40 to further treatment, or typically to disposal. The filtrate in line 41, which has been filtered by filter 39, has a greatly reduced transition metal ion content compared to the filtrate in line 27, and may be used at a wide variety of locations within the mill. Preferably, line 41 connects back up to lien 35, and the filtered filtrate is used in the wash stage 12 after the oxygen delignification stage 11 (an alkaline stage). Some part of the liquid in line 41 may pass to typical green liquor production stage 42, or will be otherwise used as necessary.

Table I below summarizes laboratory trials for treating a Z-stage effluent in accordance with the present invention. In these laboratory trials, 100 ml filtrate samples were mixed with various concentrations of lime mud, slaker grits, and green liquor. The green liquor carbonate concentration was 1.44 moles/L. The mixtures were held at 40° C. for the times spefieid in Table I, and the ion concentrations of certain metals were determiend, as listed. When comapring those samples for which broad metal analyses were done to the baseline sample (the first sample), it will be seen that there is vend effective metals removal according to the invention (note that the increase in potassium concentration is insignificant as far as effectiveness of subsequent bleaching is concenred).

That is, for the two samples according to the invention in Table I for which a complete analysis was done the metal removal efficiencies were as follows: for Ca, 80% and 91%; for Mn, 98% and 98+%; for Fe, 86% and 91%.

a pH as low as 6. It is desirable to have the pH within the range of about 6–11, preferably 8–11, to insure effective precipitation of all metals. As in the FIG. 1 embodiment, carbonate ion is also preferably added in reactor 33 when the pH is adjusted to control the calcium level in the filtrate. While the invention is described with respect to the oxidation stage 44 preceeding reactor 33, it is to be understood that they may be practiced simultaneously in the same vessel, or alkaline treatment may be performed even before

TABLE I

| Sample Volume | Lime Mud | Slaker Grits | Green Liquor | Holding Time | pH | Conc Ca | Conc Mg | Conc K | Conc Mn | Conc Fe | Conc Ba | COD |
| --- | --- | --- | --- | --- | --- | --- | --- | --- | --- | --- | --- | --- |
| 100 ml | | | | 10 min | 2.5 | 171 | 40 | 7.3 | 4.9 | 2.2 | <0.5 | 730 |
| 100 ml | 20.0 g/L | | | 10 min | 11.7 | 110 | | | | | | |
| 100 ml | 20.0 g/L | | 0.1 ml | 10 min | 11.8 | 105 | | | | | | |
| 100 ml | 20.0 g/L | | 0.7 ml | 10 min | 12.3 | 70 | | | | | | |
| 100 ml | 20.0 g/L | | 0.7 ml | 60 min | 12.3 | 35 | | | | | | |
| 100 ml | 20.0 g/L | | 7.0 ml | 10 min | 12.8 | 53 | | | | | | |
| 100 ml | 20.0 g/L | | 7.0 ml | 60 min | 12.8 | 34 | 0.2 | 1315 | 0.1 | 0.3 | <0.5 | 2620 |
| 100 ml | | 20.0 g/L | | 10 min | 11.9 | 1081 | | | | | | |
| 100 ml | | 20.0 g/L | 1.0 | 10 min | 12.2 | 476 | | | | | | |
| 100 ml | | 20.0 g/L | 0.7 | 10 min | 12.3 | 590 | | | | | | |
| 100 ml | | 20.0 g/L | 7.0 | 10 min | 13.0 | 44 | | | | | | |
| 100 ml | | 20.0 g/L | 7.0 | 60 min | 13.0 | 15 | 0.1 | 1155 | <0.1 | 0.2 | <0.5 | 2330 |

During the treatment of the pulp in the various stages 13, 15, 17, 19, it is preferred, although not necessary, that the pulp be at medium consistency (e.g. about 6–18%). While the method is particularly advantageous for kraft pulp, it may be utilized for other chemical pulps, thermomechanical pulp, chemimechanical pulp, etc.

While an OZPZP sequence is illustrated in FIG. 1, it is to be understood that many other sequences also could be utilized (e.g. as two of many examples, OZ(Eop)ZP, or OPZP).

FIG. 2 shows a modification according to the present invention for making it easier to precipitate metals out of the acidic liquid (filtrate) containing metals, typically obtained by washing or thickening in the bleach plant. In the FIG. 2 embodiment of the sequence 31", means 44 for oxidizing the filtrate in line 32 is provided before reactor 33. The oxidation means 44 brings the filtrate into intimate contact with hydrogen peroxide, ozone, air, oxygen, or combinations thereof indicated at 45 in FIG. 2, to thereby increase the valence of the metals in the filtrate so that they become easier to precipitate or flocculate. That is, after oxidation at 44, the metals precipitate at lower pHs and the species formed have lower solubility at a given pH than the species predominant in the unoxidized filtrate. For example, Mn 2+ when oxidized becomes Mn 3,4+, and Fe 2+ when oxidized becomes Fe 3+. The "Pourbaix Diagrams" for these metals indicate the relative predominance of various species ("redox couples") based upon the electro-chemical potential, Eo, and pH. The higher the potential, the stronger the oxidizing agent required to obtain the species indicated. For example, for iron, at a pH of 7 the predominant redox couple is Fe 2+—Fe(OH)3. Fe 2+ is soluble ion existing in solution while Fe(OH)3 is an insoluble solid. As the pH is increased (e.g. to 10–12), the more stable species is Fe(OH)3. However, if the solution is oxidized, i. e. the potential Eo is increased, the insoluble Fe(OH)3 becomes more predominant or is more likely to form even at neutral or even a slightly acidic pH. Thus metal precipitation is enhanced not only by increasing pH, but also by oxidation.

After oxidation at 44, the metals are easier to precipitate out of the filtrate, and in fact will start precipitating even at oxidation. Simultaneous treatment may be followed by another alkaline treatment.

It is noted that the reference to the liquids treated according to the invention as "acidic" includes a slightly acidic pH range (the chelation range of 5.5–6.0).

As indicated in FIG. 2, after pH adjustment (and carbonate ion addition) in reactor 33, the metals which have precipitated are removed, by conventional filtration, sedimentation, or flotation means 39', producing a product stream 41 used elsewhere in the pulp mill, and the sludge 40.

The oxidation means 44 may comprise a gas-contact reactor, such as illustrated in FIG. 3, or a plunger type reactor, as illustrated in FIG. 4. The oxidation means 44 is not typically necessary for treating filtrate after a Z stage (see 31' in FIG. 1).

Where the oxidizing fluid is hydrogen peroxide (a liquid) it may contact the filtrate in any conventional mixer, for example a static mixer or a stirred. The peroxide may be obtained as filtrate from a P bleach stage.

The gas-contact reactor of FIG. 3 is illustrated as a conventional ozone contactor design, although other oxidizing gases may also be utilized therewith. The ozonized air or oxygen is added at 45 in FIG. 3 to the bottom of vessel 49 having some walls 50 extending upwardly from the bottom of vessel 49, and others 51 supported with their lower portions above the bottom of vessel 49. Product filtrate is discharged at outlet 52. A gas volume 53 (oxygen and residual ozone) is maintained above the level of filtrate in vessel 49. Sparging chambers 54 are where the ozone is introduced, while the chamber 55 adjacent the discharge 52 typically has no sparging therein, but is for residence and further mixing. There is a continuous flow of filtrate from 32 to 52, and a continuous flow of gas into 45. Residual gas, depleted in ozone, passes in line 56 to an ozone destruct apparatus 57 (with substantially ozone-free gas being discharged in line 58), and/or is recycled in line 59 to inlet 45. The source of gas for 45 may be an ozone generator, vent gas from an ozone bleaching stage, ozone-enriched vent gas from an ozone stage, or from any other ozone consumer in the pulp mill. Oxygen, air, peroxide, etc., may be from any conventional source.

The plunger type reactor 44' of FIG. 4 may be used as oxidation means 44 of FIG. 3. The designation "plunger" refers to the fact that recirculating liquid plunges into a liquid level maintained in the reactor, providing agitation which exposes the liquid to oxidizing gas maintained at a predetermined pressure above the liquid level. Specifically, reactor vessel 62 has the inlet 32 for filtrate to be treated essentially at or below the level of liquid (filtrate) maintained in the vessel 62, and inlet 45 for oxidizing gas, adjacent the top of the vessel 62. Downwardly extending pipe 63 introduces recirculated liquid that "plunges" into the liquid in the vessel 62, causing agitation, and then exposure of the liquid to the oxidizing gas in atmosphere 69. Pipe 63 is connected by pipe 64 to pump 65, in turn connected to pipe 66 coming from the bottom of the vessel 62. The pump 65 essentially continuously recirculates a part of the liquid maintained in the vessel 62. Valve 69 in conduit 45 may be used to control the introduction of oxidizing gas. The valve 69 may operate in response to the pressure in the volume 69 (related to the extent to which the liquid is oxidized). A valve 72 may be provided to divert some liquid from line 66 to the pump 65 to be recirculated, and another part of the liquid into conduit 71 to pass to reactor 33.

In the operation of the plunger type reactor 44', the pH may be monitored and adjusted with the addition of time or time mud to the reactor 62 (for substantially simultaneous oxidation and pH adjustment).

It will thus be seen that according to the present invention a method and apparatus are provided which facilitate the precipitation of metals from acidic liquid streams, so that they may be precipitated at a lower pH, and the so that the species formed have lower solubility at a given pH than the species predominate in unoxidized liquid (filtrate). While the invention has been herein shown and described in what is present conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of removing metals from liquid streams in a cellulose pulp mill, comprising the steps of substantially continuously:

(a) treating digested pulp in an acidic or neutral stage to dissolve metals;

(b) washing or thickening the pulp immediately after step (a) to produce filtrate containing dissolved metals;

(c) oxidizing the filtrate to increase the valence of the dissolved metals so that they become easier to precipitate or flocculate;

(d) adjusting the pH of the filtrate so that it is at least 6, to cause dissolved metals to precipitate as solids in the pH adjusted filtrate;

(e) removing the precipitated solids from the filtrate by filtration, flotation, or sedimentation; and (f) using the reduced metal content filtrate elsewhere in the pulp mill.

2. A method as recited in claim 1 wherein step (c) is practiced using ozone, and at an acid pH of 2 or higher.

3. A method as recited in claim 1 wherein step (c) is practiced by bringing an oxidizing agent selected from the group consisting essentially of hydrogen peroxide, air, ozone, oxygen, and combinations thereof, into intimate contact with the filtrate.

4. A method as recited in claim 3 wherein step (c) is practiced using a gas-contact reactor.

5. A method as recited in claim 3 wherein steps (c) and (d) are practiced to precipitate out the vast majority of the Fe and Mn from the filtrate.

6. A method as recited in claim 5 wherein step (d) is practiced to adjust the pH of the filtrate so that it is in the range of about 8–11.

7. A method as recited in claim 3 wherein step (d) is practiced to adjust the pH of the filtrate so that it is in the range of about 6–11.

8. A method as recited in claim 3 wherein step (d) is practiced to adjust the pH of the filtrate so that it is in the range of about 8–11.

9. A method as recited in claim 3 wherein step (c) is also practiced to provide a filtrate carbonate content of at least about 0.01 mole/l.

10. A method as recited in claim 9 wherein step (c) is further practiced by adding carbonate ion so that the filtrate has a carbonate level of approximately 0.05 mole/l.

11. A method as recited in claim 3 wherein step (c) is practiced using a a plunger reactor.

12. A method as recited in claim 3 wherein steps (c) and (d) are practiced substantially simultaneously.

13. A method as recited in claim 1 wherein step (c) is practiced before step (d).

14. A method as recited in claim 1 wherein steps (c) and (d) are practiced to precipitate out the vast majority of the Fe and Mn from the filtrate.

15. A method as recited in claim 1 wherein step (d) is practiced to adjust the pH of the filtrate so that it is in the range of about 6–11.

16. A method as recited in claim 1 wherein step (c) is practiced using oxygen, air, or oxygen enriched air, and at an acid pH of 4 or higher.

17. A method as recited in claim 1 wherein step (d) is practiced to adjust the pH of the filtrate so that it is in the range of about 8–11.

18. A method as recited in claim 1 wherein step (c) is also practiced to provide a filtrate carbonate content of at least about 0.01 mole/l.

19. A method as recited in claim 1 wherein step (c) is further practiced by adding carbonate ion so that the filtrate has a carbonate level of approximately 0.05 mole/l.

* * * * *